(12) United States Patent
Zimmermann et al.

(10) Patent No.: US 7,008,349 B2
(45) Date of Patent: Mar. 7, 2006

(54) SYSTEM FOR CONTROLLING A TRANSMISSION COMPONENT IN A VEHICLE TAKING INTO CONSIDERATION A POSSIBLE FLUID LOSS

(75) Inventors: Martin Zimmermann, Sasbach (DE); Klaus Kuepper, Buehl (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/761,117

(22) Filed: Jan. 20, 2004

(65) Prior Publication Data

US 2004/0166988 A1 Aug. 26, 2004

Related U.S. Application Data

(63) Continuation of application No. PCT/DE02/02589, filed on Jul. 15, 2002.

(30) Foreign Application Priority Data

Jul. 19, 2001 (DE) .......................... 101 35 121

(51) Int. Cl.
*B60K 41/04* (2006.01)

(52) U.S. Cl. ...................... 477/107; 477/906

(58) Field of Classification Search .............. 477/107, 477/ 906
See application file for complete search history.

(56) References Cited

U.S. PATENT DOCUMENTS

| 4,075,912 | A | * | 2/1978 | Schaefer | 477/125 |
|---|---|---|---|---|---|
| 4,494,423 | A | | 1/1985 | McCarthy et al. | 74/869 |
| 4,846,021 | A | | 7/1989 | Hamano et al. | 74/866 |
| 5,182,969 | A | | 2/1993 | Goto et al. | 74/866 |
| 5,315,972 | A | * | 5/1994 | Judy et al. | 123/198 D |
| 6,223,873 | B1 | * | 5/2001 | Ahnert et al. | 192/3.56 |

FOREIGN PATENT DOCUMENTS

| DE | 19857707 | 6/1999 |
|---|---|---|
| JP | 11315858 | 11/1999 |

\* cited by examiner

*Primary Examiner*—Dirk Wright
(74) *Attorney, Agent, or Firm*—Davidson, Davidson & Kappel, LLC

(57) ABSTRACT

A system for controlling a component of a gear in a vehicle, especially a clutch, through a hydraulic transmission link. The system includes a transmission control unit and an engine control unit, whereby a loss in fluid in the transmission link can be detected or a hazardous situation caused by the potential for fluid loss is avoided, whereupon the engine and/or the transmission can be suitably controlled using the transmission control and/or engine control unit.

18 Claims, 3 Drawing Sheets

SYSTEM FOR CONTROLLING A TRANSMISSION COMPONENT IN A VEHICLE TAKING INTO CONSIDERATION A POSSIBLE FLUID LOSS

CROSS-REFERENCE TO RELATED APPLICATIONS

This is a continuation of International Patent Application No. PCT/DE02/02589, filed Jul. 15, 2002, and claims priority to German Patent Application No. 101 35 121.6, filed Jul. 19, 2001. Both applications are hereby incorporated-by-reference herein.

BACKGROUND INFORMATION

The present invention relates to a system for controlling a transmission component in a vehicle, a clutch in particular, vian a hydraulic transmission link using a transmission controller and an engine controller.

In vehicles having an automated clutch and/or an automated transmission a fluid loss or a leakage may occur, caused, for example, by corrosion or other damage to the transmission link, in particular to the master cylinder, the slave cylinder, or at the seals. This may disadvantageously result in the fact that the clutch may no longer be fully disengaged by the transmission link, for a gearshift or to stop, for example.

The venting bore may remain open until the shifting intent is triggered, in particular when no torque tracking in the clutch is provided. In the known system, the transmission and engine controllers cannot detect or account for this error since, in the event of a fluid loss, the clutch travel sensor indicates a plausible signal, so that the setpoint travel in the clutch is adjusted correspondingly.

BRIEF SUMMARY OF THE INVENTION

An object of the present invention is to provide a system in which a fluid loss is detected and/or hazardous situations in the vehicle are prevented.

According to the present invention, a system for controlling a component, such as a clutch or the like, for example, is proposed which can detect fluid losses or take into account the possibility of fluid losses in the transmission link which can cause a hazardous situation and which subsequently controls the transmission and/or the engine of the vehicle preferably via the transmission and/or engine controller in such a way that hazardous situations in the vehicle are prevented.

The detection of a fluid loss in the transmission link or avoidance of hazardous situations may preferably be implemented as a function of predefined vehicle operating states. It is also conceivable that this is possible by using other signals, e.g., vehicle signals, sensor signals or the like.

A particularly hazardous situation, caused by the fluid loss in the transmission link, may occur if, for example, the vehicle is parked with the engine running, the driver has left the vehicle and the creep function is deactivated via the hand brake switch, for example. This situation creates the danger of the vehicle starting to move by itself. Therefore, this situation is to be considered particularly hazardous since the driver has no way to react.

To avoid this situation, it may be provided according to an advantageous refinement of the present invention that the transmission controller preferably engages the neutral position in this situation. For this it is necessary that the system according to the present invention detects the point in time when this situation exists or when the situation might become a possibility. Preferably predefined vehicle operating states may be used for this.

According to an advantageous refinement of the present invention it may be provided that a fluid loss in the transmission link or a potential hazardous situation is detected by the system when at least one of the following operating states exists. When, for example, the vehicle is parked or the vehicle speed is lower than a predefined speed and/or when a gear is selected, i.e., the selector lever is not in the neutral position, and/or when the hand brake and/or the service brake are/is applied, and/or when the aforementioned operating states last for a certain time interval, e.g., longer than five seconds or the like.

Further suitable operating states may be added to the aforementioned operating states; the aforementioned situation exists in particular when all aforementioned operating states are present. It is also possible that the analysis of the door signal of the driver door is additionally used as an operating state in order to detect whether a driver leaves or gets into the vehicle. In order to return to the normal function it should be recognized whether the driver is back inside the vehicle. This may be detected, for example, through the releasing of the service brake or by pressing the accelerator. Subsequently, a gear may be engaged again, for example, and, preferably, the start function or the creep function may be activated.

In the system according to the present invention, a delay through activating the neutral state to engaging the gear is hardly noticeable by the driver. To further shorten this delay, it is conceivable that the selector of the transmission controller stops beforehand in the shift track before the first gear. In addition, it may be provided, for example, that a flashing "N" or the like is shown on the vehicle display in order to indicate to the driver this intervention in the transmission controller.

Another situation in which a fluid loss in the transmission link is hazardous may present itself when, for stopping the vehicle, the clutch is no longer fully disengaged. In the worst case, the driver must stall the engine by pressing the service brake in this situation in order to stop the vehicle.

The aforementioned situation is considered less hazardous, but is still considered hazardous as defined herein, since it is possible for the driver to stop the vehicle by using the brake. According to the present invention, recognition of the possibility of such a hazardous situation may be implemented in that at least one of the following operating states is present. When, for example, the service brake is applied, and/or when the clutch signals the status "disengaged," and/or when the engine speed is below the idling setpoint, and/or when the idle control torque is increased, in particular above a predetermined limiting value.

A fluid loss or the potential for a hazardous situation is preferably detected if all aforementioned operating states are present. Using the engine controller, the system according to the present invention may make an active shutdown of the engine possible, thereby avoiding the undesired situation in an advantageous manner. It is also possible that in the presence of the aforementioned operating states, other reactions are performed.

In the situation described, it is particularly advantageous if the system is integrated into the engine controller in this case since, via the engine controller, the operating states and the point in time when an engine torque is to be built up via the idle controller may be detected in the simplest way. In addition, using the information of the transmission or clutch controller, the engine controller is able to actively shut down the engine.

It is also conceivable that the engine is actively shut down via the transmission control unit, an ECM control unit in particular, only when, with the service brake applied and additionally with too low an engine speed, the pressure in the transmission link is not sufficient to disengage the clutch, or also when an error was already detected in the position controller which is present independently of the engine torque.

A further situation in which a fluid loss in the transmission link is present may be detected when the operating state is present in which no new gear can be engaged and/or when the synchronizer is damaged.

The vehicle is disabled in this case since the vehicle transmission is damaged. In order to monitor this situation, it may be provided according to the present invention that the system performs suitable long-term monitoring of the synchronizing time. At least a gradual error in the transmission link may be detected in this way.

DETAILED DESCRIPTION

Figure 1:
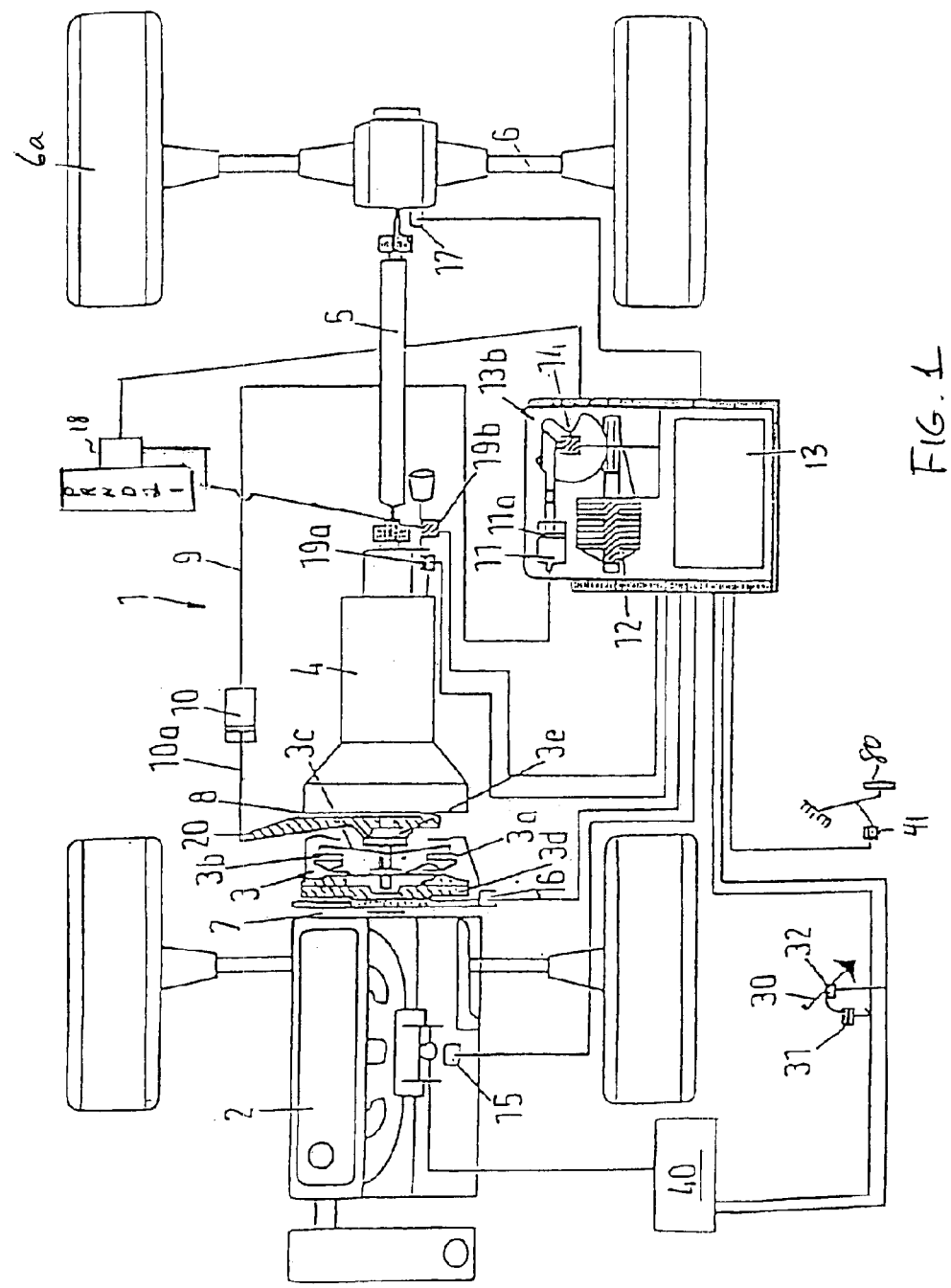
FIG. 1 shows schematically a motor vehicle equipped with an automated clutch actuated hydraulically and with controllers according to the present invention.

FIG. 1 shows a motor vehicle 1 with an engine 2, a clutch 3 and a transmission 4 connected to a drive shaft 5. Drive shaft 5 drives an axle 6 and wheels 6a. Clutch 3 has an input side 7 and an output side 8, clutch parts 3a, 3b, 3c, 3d, 3e and a clutch controller 13 which controls an actuator 13b. Actuator 13b has a drive motor 12, a position sensor 14 and a master cylinder 11 with a master cylinder piston 11a. The sensor 13 can measure the position of the piston 11a.

Master cylinder 11 drives a slave cylinder 10 through a fluid line 9, the slave cylinder having a slave piston 10a actuating a clutch release device 20, for example a clutch release fork, which can cause clutch 3 to disengage. Thus when piston 10a is to the left in cylinder 10 (as shown), clutch 3 is disengaged, and when piston 10a is to the right in cylinder 10, clutch 3 is fully engaged and transmits force from engine 2 to transmission 4, which is also its preloaded position.

Automatic clutch controller 13 can receive an input from a sensor 41 for a brake pedal 80, and from an accelerator 30, accelerator sensor 31 and an idle switch 32. Sensor 15 is a throttle valve sensor, sensor 16 an engine speed sensor, and sensor 17 a tacho sensor.

Transmission 4 is for example controlled by a transmission controller 18 which is connected to a gear selection device and to the clutch controller 13. Sensors 19a and 19b, or controller 18, can provide inputs to the clutch controller on the actual position and/or speed of parts of transmission 4. Controller 13 can provide signals to transmission controller 18.

Engine 2 is controlled by engine controller 40, which for example controls the amount of gas fed to engine 2 and is connected to controller 13.

Clutch 3 is controlled by clutch controller 13 as a function of various sensor inputs and characteristic curves.

The transmission controller 18 and engine controller 40 advantageously can be operated to prevent hazardous situations which might arise should fluid leak in the master cylinder 11, slave cylinder 10 or fluid line 9 occur.

Figure 2:
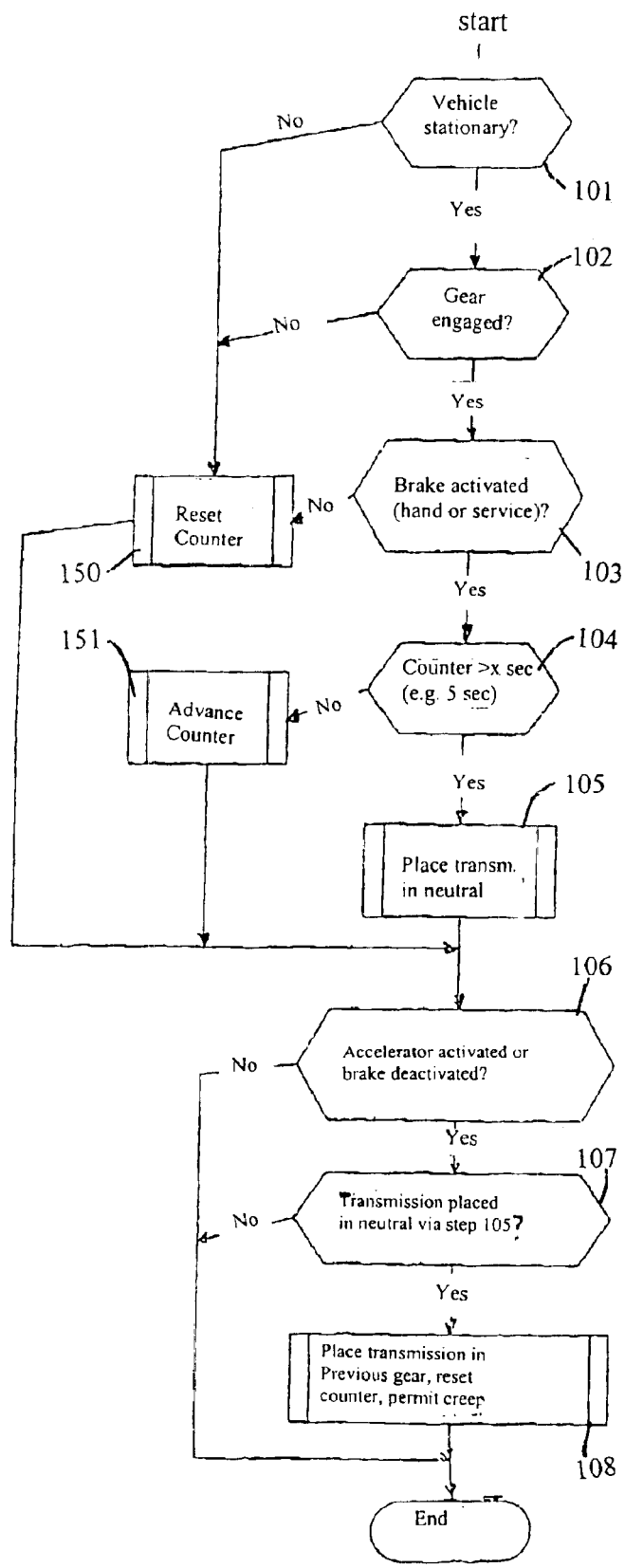
FIGS. 2 and 3 show methods according to the present invention.

FIG. 2 shows for example one method of the present invention for avoiding a hazardous situation which may arise from a fluid leak. The method may be run for example by controller 13. Should fluid leak, clutch 3 may engage further and in certain situations the vehicle might move so as to cause a hazardous situation.

One such hazardous situation is determined as follows: In step 101 it is determined if the vehicle is stationary, in step 102 if the vehicle is in gear, in step 103 if the hand or service brake is engaged and in step 104 if a time counter exceeds a certain predetermined number. Thus according to the present invention, if these conditions are fulfilled, the transmission 4 may be placed by transmission controller 18 in step 105 in neutral, which can prevent any hazardous situation from occurring should fluid leak and clutch 3 further engage. It is not necessary for a fluid leak to be detected, but rather that the situation where a fluid leak is hazardous is avoided. It is noted however that should the vehicle begin to move with these conditions, the fluid leak could be detected for example via sensor 17.

In step 106, the controller determines if the accelerator 30 has been activated or the brake is again inactive. If so, step 107 determines if the transmission has been placed in neutral according to the safety steps of 101 to 104, and if so the transmission is moved in step 108 to the gear where it was before step 101, the time counter is reset, and the creep or drive function unblocked.

In step 150 the time counter is reset if a vehicle brake is not activated, and in step 151, the time counter is advanced if the time counter does not exceed the predetermined limit, and the program continued at step 105. The program is rerun by the controller.

Figure 3:
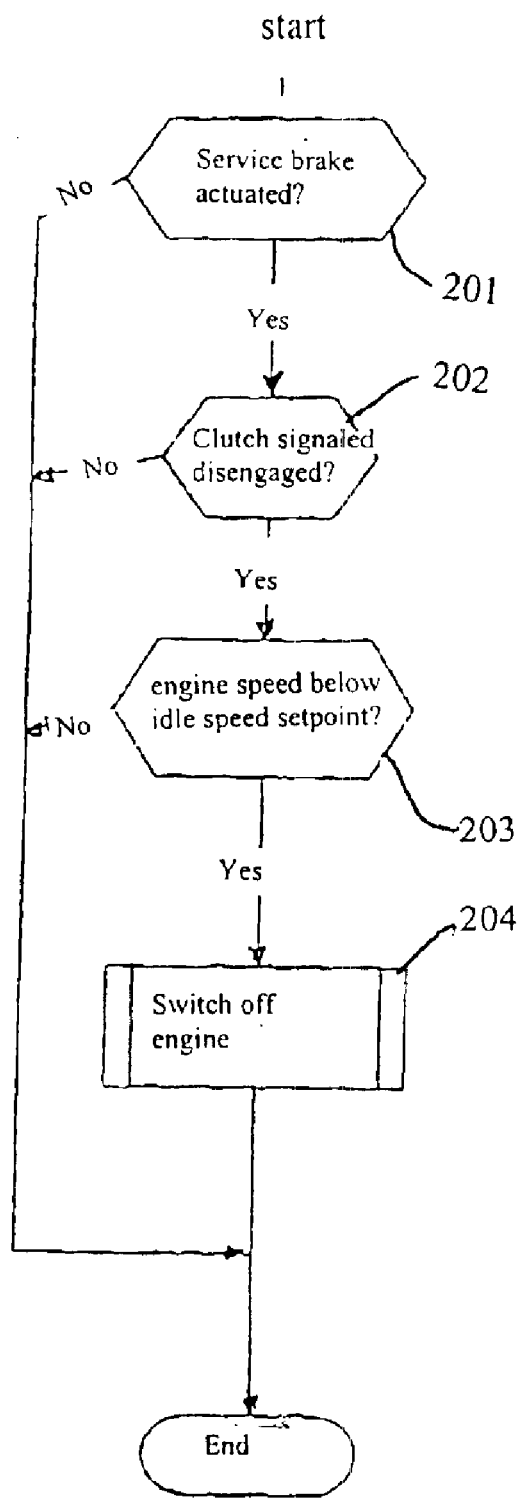

FIG. 3 shows a safety function for avoiding another hazardous situation, which also may be run on controller 13. If the service brake is activated in step 201, the clutch is determined as open in step 202 and the engine speed is determined as below an idling setpoint in step 203, the engine 2 is switched off in step 204. This can prevent for example lurching or stalling if a fluid leak were to occur and the clutch 3 engage.

What is claimed is:

1. A system for controlling a vehicle with a transmission component having a hydraulic transmission link, the system comprising:

a transmission controller; and an engine controller, the engine and/or the transmission being controlled by the transmission controller and/or the engine controller so as to detect a fluid loss or to avoid a hazardous situation capable of occurring from a fluid loss in the hydraulic transmission link.

2. The system as recited in claim 1 wherein the transmission component is a clutch.

3. The system as recited in claim 1 wherein the fluid loss or hazardous situation is detected as a function of at least one operating state of the vehicle.

4. The system as recited in claim 3 wherein the fluid loss or hazardous situation is determined as a function of at least one of the following: whether the vehicle is parked, whether a gear is selected, whether a vehicle brake is applied, and whether the at least one operating state is present for a predetermined time interval.

5. The system as recited in claim 4 wherein the predetermined time interval is five seconds.

6. The system as recited in claim 4 wherein, at the time of detection of the at least one operating state, a neutral state of the transmission is selectable via the transmission controller.

7. The system as recited in claim 6 wherein the neutral state is terminated when a gear is engaged, when the brake application is terminated, and/or when an accelerator is pressed.

8. The system as recited in claim 7 wherein, after engaging a gear, a start function or a creep function is activatable.

9. The system as recited in claim 1 wherein the fluid loss or hazardous situation is determined as a function of at least one of the following: whether a vehicle brake is applied; whether a clutch signals the status "disengaged;" whether the engine speed is below an idle setpoint, and whether an idle control torque is increased.

10. The system as recited in claim 9 wherein, at the time of detection of the at least one operating state, the engine can be shut down via the engine controller.

11. The system as recited in claim 1 wherein a fluid loss or hazardous situation is detectable when no new gear is engageable.

12. The system as recited in claim 11 further comprising monitoring of a synchronizing time, whereby at least a gradual error is detectable.

13. A method for controlling a vehicle having an automatic clutch and a controller for the clutch controlling the clutch via a fluid transmission link capable of leaking comprising the steps of:

determining a situation of the vehicle where a leak in the fluid transmission link would be a hazardous situation, and turning off the engine or placing the transmission in neutral during the hazardous situation.

14. The method as recited in claim 13 wherein the hazardous situation is determined when the following conditions are met: the transmission is in gear; a vehicle brake is activated; and an accelerator has not been activated or the vehicle brake has not been deactivated for a predetermined time.

15. The method as recited in claim 14 wherein the transmission is placed in gear when a gear is engaged, when the vehicle brake is deactivated and/or when the accelerator is pressed.

16. The method as recited in claim 15 wherein a creep function is activated when the transmission is placed in gear.

17. The method as recited in claim 13 wherein the hazardous situation is determined when the following conditions are met: a vehicle brake is applied, the clutch signals a "disengaged" status, and when the engine speed is below an idle setpoint.

18. The method as recited in claim 17 wherein the engine is shut down via an engine controller when the hazardous situation is determined.

* * * * *